(12) United States Patent
Sasaki et al.

(10) Patent No.: US 7,065,525 B1
(45) Date of Patent: Jun. 20, 2006

(54) INFORMATION SERVICE SYSTEM FOR PROVIDING TERMINAL USERS WITH TERMINAL USER SPECIFIC INFORMATION

(75) Inventors: Mikio Sasaki, Kariya (JP); Katsushi Asami, Kariya (JP)

(73) Assignee: Denso Corporation, Kariya (JP)

( * ) Notice: Subject to any disclaimer, the term of this patent is extended or adjusted under 35 U.S.C. 154(b) by 61 days.

(21) Appl. No.: 09/605,688

(22) Filed: Jun. 27, 2000

(30) Foreign Application Priority Data

Jun. 30, 1999  (JP) ................................. 11-185567

(51) Int. Cl.
 *G06F 17/30* (2006.01)
(52) U.S. Cl. ............................ 707/10; 707/3; 707/102; 707/103 X; 707/104.1
(58) Field of Classification Search .................. 707/10, 707/102, 203, 3, 103 X, 104.1; 709/105, 709/220, 224; 370/466, 401; 701/215, 201, 701/213; 340/521; 455/509; 244/158; 324/175; 435/23; 342/357.02; 600/595; 345/8
See application file for complete search history.

(56) References Cited

U.S. PATENT DOCUMENTS

| | | | | |
|---|---|---|---|---|
| 5,278,980 A | | 1/1994 | Pedersen et al. ................. 707/4 |
| 5,323,322 A | * | 6/1994 | Mueller et al. .............. 701/215 |
| 5,446,445 A | * | 8/1995 | Bloomfield et al. ......... 340/521 |
| 5,687,372 A | * | 11/1997 | Hotea et al. ................. 709/105 |
| 5,713,018 A | * | 1/1998 | Chan ............................ 707/10 |
| 5,724,575 A | * | 3/1998 | Hoover et al. ................ 707/10 |
| 5,940,769 A | * | 8/1999 | Nakajima et al. ............ 455/509 |
| 5,948,040 A | * | 9/1999 | DeLorme et al. ............ 701/201 |
| 5,990,676 A | * | 11/1999 | Hori ............................ 324/175 |
| 6,132,391 A | * | 10/2000 | Onari et al. ................. 600/595 |
| 6,230,156 B1 | * | 5/2001 | Hussey ........................ 707/10 |
| 6,255,064 B1 | * | 7/2001 | Tindal et al. ................. 435/23 |
| 6,292,132 B1 | * | 9/2001 | Wilson .................. 342/357.02 |
| 6,321,158 B1 | * | 11/2001 | DeLorme et al. ........... 701/201 |
| 6,352,222 B1 | * | 3/2002 | Maeda et al. ........... 244/158 R |
| 6,360,225 B1 | * | 3/2002 | Kleewein et al. ........... 707/102 |
| 6,446,092 B1 | * | 9/2002 | Sutter ......................... 707/203 |
| 6,546,336 B1 | * | 4/2003 | Matsuoka et al. .......... 701/213 |

(Continued)

FOREIGN PATENT DOCUMENTS

JP          07-006297          1/1995

(Continued)

OTHER PUBLICATIONS

Wahab et al., "A Method for Increasing GPS Working Area", IEEE, 1998, pp. C9/1-C9/10.*

(Continued)

*Primary Examiner*—Thuy N. Pardo
(74) *Attorney, Agent, or Firm*—Posz Law Group, PLC

(57) ABSTRACT

An information service system having user terminals and a center in which information according to a request for retrieval is provided to users at a low cost while simplifying setting of conditions for retrieval at the user terminals is simplified and maintaining real-time properties. A profile database at a center is updated using profile information transmitted by user terminals to construct an information database. Further, profile information used for retrieval is generated such that it includes information on the environment and situation around a user and information of requests and status of the user to allow proper retrieval in addition to verbal information from the user. The center searches the information database based on such profile information to provide information to the user terminal.

18 Claims, 5 Drawing Sheets

U.S. PATENT DOCUMENTS

| | | | |
|---|---|---|---|
| 6,653,990 B1 * | 11/2003 | Lestruhaut | 345/8 |
| 6,695,259 B1 * | 2/2004 | Maeda et al. | 244/158 R |
| 6,724,775 B1 * | 4/2004 | Watanuki et al. | 370/466 |
| 6,765,920 B1 * | 7/2004 | Tari et al. | 370/401 |

FOREIGN PATENT DOCUMENTS

| | | |
|---|---|---|
| JP | 07-312774 | 11/1995 |
| JP | 08-261770 | 10/1996 |
| JP | 10-003419 | 1/1998 |
| JP | 10-253366 | 9/1998 |
| JP | 11-134343 | 5/1999 |
| JP | 11-136766 | 5/1999 |

OTHER PUBLICATIONS

U.S. Appl. No. 09/328,339, filed Jun. 9, 1999, Sasaki.

U.S. Appl. No. 09/490,442, filed Jan. 24, 2000, Sasaki et al.

Uehara et al., "Internet CAR; Internet-Connected Automobiles," Proc. of *All About ISOC: Conferences—INET '98*, Jul. 21, 1988.

Wide Project 1997 Research Report, Mar. 1998, Japan, pp. 383-425.

Wide Project 1998 Research Report, Mar. 1999, Japan, pp. 407-439, pp. 465-499.

* cited by examiner

INFORMATION SERVICE SYSTEM FOR PROVIDING TERMINAL USERS WITH TERMINAL USER SPECIFIC INFORMATION

CROSS REFERENCE TO RELATED APPLICATION

This application is based upon Japanese Patent Application No. Hei. 11-185567 filed on Jun. 30, 1999, the contents of which are incorporated herein by reference.

BACKGROUND OF THE INVENTION

1. Field of the Invention

This invention relates to information retrieving service systems, and particular to an information retrieving information retrieving service system using communication.

2. Related Art

Recently, information service systems utilizing communication functions are known. For example, when a user operates a user terminal to establish a data communication enabled state between the terminal and a center and to request retrieval of predetermined information, an information database at the center is searched and information corresponding to the request for retrieval is distributed.

However, such conventional information service systems have had the following problems.

(1) In order to retrieve desired information, a user terminal may request a center to retrieve the information using, for example, keywords as conditions for retrieval. It has been difficult to set such conditions for retrieval because a great number of keywords must be input to retrieve desired information exactly.

(2) An enormous amount of time and labor needed to construct an information database at a center results in relatively high information charges.

(3) The difficulty of real-time updating of an information database at a center increases with the ratio of the amount of rapidly changing dynamic information present in the database.

SUMMARY OF THE INVENTION

This invention has been conceived in view of the background thus far described and its object is to provide a user with information to his or her request for retrieval at a low cost while allowing simple setting of conditions for retrieval and maintaining real-time properties.

An information service system according to a first aspect of the invention which has made to achieve the above-described object has a plurality of user terminals and a center capable of data communication with the user terminals. The user terminals of this system are especially intended to be used as mobile apparatuses, although they may be used in a stationary state. For example, they may be loaded in vehicles to be used as information retrieval apparatuses for allowing effective use of known navigating functions. The following description will refer to an example in which the user terminals of the present system are loaded on vehicles.

A user inputs information into a user terminal with input means. The input means may be means for inputting information from a user on an audio basis. For example, verbal information from a user, i.e., "Is there any restaurant near here?", in response to a prompt on a user terminal based on an interactive database may be input. When the input means is configured as a keyboard device at a user terminal, a user may input information using the keyboard device.

Situation detecting means detects information on the situation of a user. When a user terminal is loaded on a vehicle along with a navigation apparatus, for example, the date, time, current location, destination, ambient temperature, internal temperature, weather, audio environment, noise environment and the like are detected as information of a situation around a user.

Terminal-side information generation means generates terminal-side information including at least information input with the input means and situation information detected by the situation detecting means. It reads "at least" because information including information on the vehicle may be generated as the terminal-side information.

When terminal-side information is generated, storage and transmission means stores the generated terminal-side information in memory means and transmits it to the center.

At the center, database construction means adds information based on terminal-side information transmitted by a plurality of user terminals to the information database. That is, information transmitted by a plurality of user terminals is accumulated at the center as an information database. While the information database may be constructed from only information based on transmitted terminal-side information, it is more practical to construct the database by adding such information to an existing information database.

When terminal-side information is transmitted from a user terminal, retrieval means at the center retrieves information according to the transmitted terminal-side information from the information database. The information retrieved by the retrieval means is distributed by distribution means to the user terminal as distributed information.

Then, process execution means at the user terminal executes a predetermined process based on the distributed information from the center.

Specifically, according to a second aspect of the invention, when a request for retrieval is included in terminal-side information, the retrieval means at the center may "retrieve information according to the transmitted terminal-side information" by retrieving information according to the request for retrieval using information included in the terminal-side information. In this case, the process execution means of the user terminal executes a notification process for notifying of information distributed by the center as distributed information. For example, when terminal-side information includes a request for retrieval of "restaurants", information of restaurants which are located near the present location and on the route to the destination will be retrieved if the terminal-side information includes information of the present location and destination.

At this time, according to a third aspect of the invention, the retrieval means at the center may retrieve information relevant to a request for retrieval by inferring it from information included in terminal-side information. For example, when terminal-side information includes verbal information from the user, restaurants that serve cool foods or restaurants having a cool atmosphere will be retrieved if the contents of the speech are "I wish something to eat", "It's hot" and the like.

That is, in the information service system according to the invention, the source of information for constructing the information database at the center is the plurality of user terminals. In other words, the information database at the center is constructed based on terminal-side information transmitted by the user terminals. The information database is therefore semi-automatically constructed, which reduces time and labor required for construction. Further, when a center constructs an information database, it normally pays information charges to the sources of information. Therefore, users pay information charges for information supplied by the center. According to the invention, since users themselves provide information as sources of information, information charges to be paid by the users for information acquired from the center can be set low.

Further, the information database can be updated on a nearly real-time basis by reducing information transmission periods of the user terminals or increasing the number of the user terminals.

That is, the problems mentioned in the above items (2) and (3) can be solved in the information service system according to the invention.

Terminal-side information includes not only information input with the input means but also situation information detected by the situation detecting means. Proper information can be retrieved at the center because information is retrieved according to such terminal-side information. Specifically, in response to a request for retrieval, information which agrees with or which is assumed to agree with the request for retrieval can be provided. For example, this eliminates the need for inputting a great number of keywords as conditions for retrieval. Therefore, the problem mentioned in the above item (1) can be solved in the information service system according to the invention.

At the center, information based on terminal-side information transmitted by each of the user terminals is added to the information database as described above. The information based on the terminal-side information may be information transmitted by the user terminals as the terminal-side information or information obtained by processing the transmitted information. Alternatively, the information may include both of them.

As a possible configuration for processing and storing the transmitted information, the database construction means may be configured to add information obtained by editing terminal-side information to the information database as information based on the terminal-side information (fourth aspect of the invention). For example, when the user terminals are loaded on vehicles, information on the destination from each of the user terminals may be edited to predict traffic jams on the route to the destination, and the traffic jam prediction information is added to the information database. For example, terminal-side information may be edited to extract rules for statistical inference which may specifically include statements "XX Café is crowded on Saturday afternoon", "Traffic jams occur near ZZ intersection from 7 to 10 in weekday mornings" and the like. This is advantageous in that it is possible to access, at a user terminal, not only information from each of the user terminals but also information which can be made available only by integrating such pieces of information.

In the information service system according to the invention, the center retrieves information according to a request for retrieval from a user utilizing the information database which is constructed based on terminal-side information from each of the user terminals.

Therefore, according to a fifth aspect of the invention, the terminal-side information may be constituted by information associated with predetermined entries required for inferring information which is relevant to a request for retrieval. For example, entries such as date and time, the present location, destination, ambient temperature and internal temperature of a vehicle, weather, traffic situation, audio environment, noise environment, a user request, a user status, a user designation, a user's favorite foods, a user's hobbies, a user's favorite shops may be set as such predetermined entries. Such entries are set because a request for retrieval depends on the environment and state of a user. Such an arrangement makes it possible to infer information relevant to a request for retrieval with accuracy higher than that in the case where various kinds of information are transmitted as terminal-side information from each of the user terminals. This also makes it possible to improve the capacity of the information database. Not all pieces of information associated with such entries are necessarily known. Therefore, when no information is available for an entry, information for such an entry is generated as "none".

When terminal-side information includes various entries as described above, the terminal-side information may be treated in units which allow the terminal-side information to be easily retrieves and edited. For example, according to a sixth aspect of the invention, terminal-side information may be stored, transmitted and received in profiles each of which describes information associated with particular entries among predetermined entries.

For example, terminal-side information may be managed in profiles prepared in advance such as an environment/situation profile which describes information associated with the entries of date and time, the present location, destination, ambient temperature and internal temperature of a vehicle, weather, traffic status, audio environment and noise environment, a request/status profile which describes information associated with the entries of a user request and a user status and a user profiles which describes a user designation, a user's favorite foods, a user's hobbies and a user's favorite shops. By storing terminal-side information in profiles which describes information associated with particular entries as described above, for example, information on a shop can be retrieved by retrieving user profiles which describes information associated with an entry "favorite shops", which is advantageous in that retrieval is simplified.

Specific examples of types and units of information to be managed as the above-described terminal-side information will be described in detail in preferred embodiments of the invention.

On an assumption that the terminal-side information is constituted by information associated with predetermined entries as described above, according to a seventh aspect of the invention, the terminal-side information generation means at a user terminal may generate terminal-side information by inferring unknown information associated with certain entries of the terminal-side information based on past terminal-side information stored in the memory means. The storage of past terminal-side information makes it possible to infer unknown information to some extent by retrieving past terminal-side information which has been generated in similar situations. This makes it possible to improve the integrity of terminal-side information without increasing input operations of users.

However, the closed environment of a user terminal puts a certain limit on the inference of unknown pieces of information in terminal-side information. For example, information such as weather information is not reliable enough when it is inferred by referring to past terminal-side information.

Under such circumstances, a configuration according to an eighth aspect of the invention may be adapted. Specifically, the configuration is characterized in that the retrieval means at the center retrieves unknown information associated with certain entries of transmitted terminal-side information, and the process execution means at a user terminal executes an information updating process for adding information which is the unknown information retrieved by the retrieval means and transmitted as distributed information from the center to terminal-side information stored in the memory means thereof.

When the terminal-side information generation means generates terminal-side information as described above, a certain limit is put on the inference of unknown entries. In this configuration, therefore, information associated with unknown entries is retrieved at the center. For example, when information on the weather at a destination is unknown, information transmitted by a different user terminal located near the destination recently may be retrieved. This makes it possible to identify the weather information with some reliability even when the user does not input weather information through the input means.

When weather information is unknown, information associated with the entry can be retrieved by searching the information database based on the location and time of interest. However, some kinds of unknown information cannot be retrieved under certain conditions for retrieval.

Under such circumstances, according to a ninth aspect of the invention, the retrieval means at the center may retrieve unknown pieces of information among transmitted terminal-side information based on past terminal-side information stored in the information database which has been selected as being similar to the transmitted terminal-side information. Plural pieces of terminal-side information may be selected as the past terminal-side information similar to the transmitted terminal-side information. By selecting similar terminal-side information as described above, it is possible to infer unknown information which is difficult to retrieve under certain conditions for retrieval.

When information similar to transmitted terminal-side information is selected from among pieces of past terminal-side information stored in the information database, the degree of similarity may be calculated on the basis of profiles, and terminal-side information may be selected based on the calculated degree of similarity (tenth aspect of the invention). The management of information on the basis of profiles is advantageous also in that similarity can be properly determined in such a manner.

By inferring unknown information included in terminal-side information at the center in such a manner, the amount of information to be input by users can be reduced, and inference can be accurately made with some degree of accuracy for certain entries, which is very much convenient for users.

For example, when relevant information is to be retrieved in response to a request for retrieval, terminal-side information may include important and unimportant pieces of information. For example, in the case of retrieval of restaurants, while information such as favorite foods and present location of the user is important information, information such as the name of the user is not required. When such important information is unknown or unreliable even though it is known, retrieval of information relevant to a request for retrieval is likely to fail at last.

Under such circumstances, according to an eleventh aspect of the invention, the user terminals may have a configuration including priority setting means and query means. The priority setting means sets a priority for each entry of terminal-side information based on information input with the input means. For example, when a user inputs information on an audio basis with through input means, the priority of each entry can be changed based on the contents of the user's speech. For example, if the contents of a user's speech are related to "dining", relatively high priorities are given to entries such as favorite foods of the user and the present location of the user as described above. High priorities may be set for certain entries depending on speech contents by storing relationship between the speech contents and the entries to be given higher priorities in advance.

When information associated with an entry for which a relatively high priority has been set with the priority setting means does not satisfy predetermined conditions, the query means instructs the user to input the information. The predetermined conditions are not satisfied, for example, when no information is available on an entry of interest, when a considerable time has passed since the time of description of such information in spite of the fact that it is dynamically changing information or when the reliability of such information is low.

The use of such a configuration improves the reliability of information associated with entries which are important as conditions for retrieval, which increases the probability of retrieval of information relevant to a request for retrieval. In this case, although the number of input operations to be performed by a user is increased, the number of user input operations can be sufficiently reduced from that in the case of conventional systems because no user input operation is required for even inferred information if it is reliable.

If it is assumed that the user terminals of the information service system are used on vehicles, when transmitted terminal-side information includes information on the location of a vehicle, the retrieval means at the center may retrieve information on the scene around the location of the vehicle; the distribution means may be configured to distribute the scene information to the user terminal as distributed information; and the process execution means at the user terminal may execute a structure inferring process for inferring the environment in which the vehicle is traveling based on the scene information as distributed information (twelfth aspect of the invention).

While techniques for acquiring traveling environments ahead a vehicle using a radar or camera have been proposed and implemented, it is difficult to discriminate human beings and vehicles from other objects with existing recognition techniques. Therefore, scene information is distributed from the center to allow the environment of a vehicle to be properly inferred based on such scene information. Information on the relationship between objects that form a scene or information on the structure of a scene represented by three-dimensional data may be used as scene information.

Such scene information may be transmitted from a user terminal to the center as image information and may be edited at the center (thirteenth aspect of the invention). This eliminates the need for installing cameras or the like to acquire images of scenes. As a result, information can be collected even in a depopulated area where no camera is normally installed if a vehicle loaded with a user terminal is located in such an area. In a densely populated area whose scenery changes relatively rapidly as a result of construction and pulling down of buildings, scenery information can be updated in real-time by collecting image information from each user terminal.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

First Embodiment

A specific embodiment of the present invention will now be described with reference to the drawings.

Figure 1:
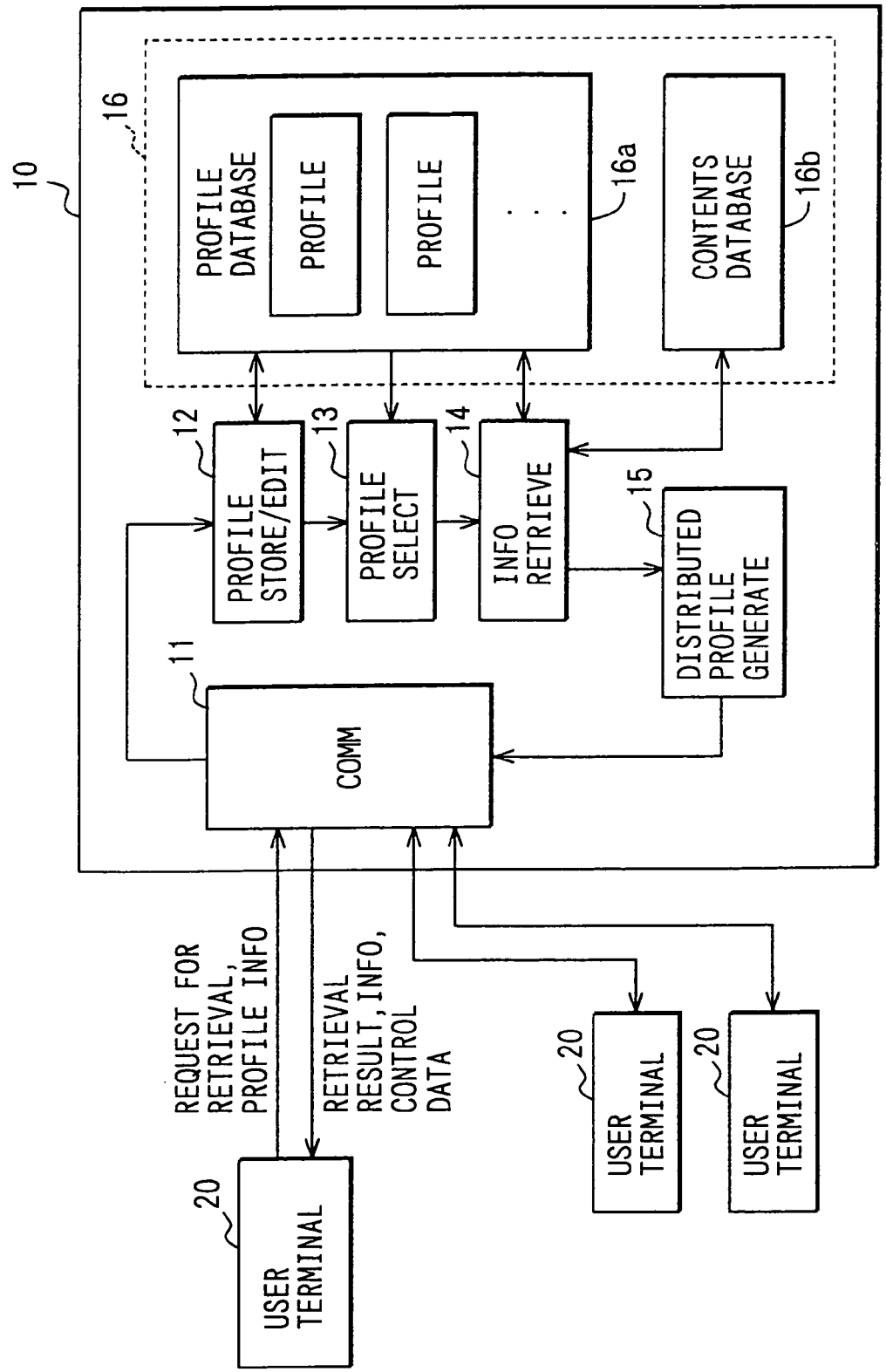
FIG. 1 is a functional block diagram showing a schematic configuration of a center according to an embodiment of the invention.
Figure 2:
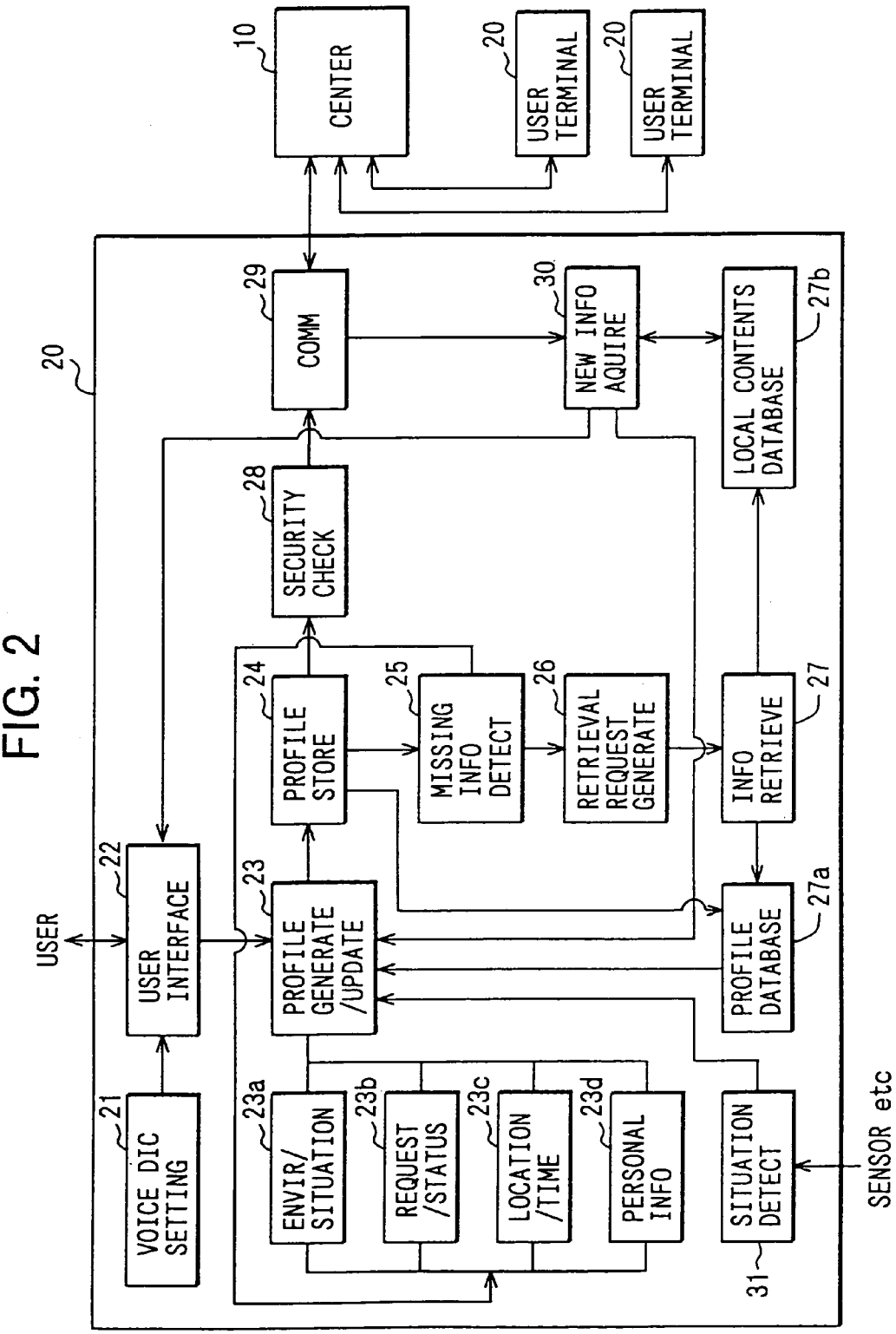
FIG. 2 is a functional block diagram showing a schematic configuration of a user terminal according to the embodiment of the invention.

FIGS. 1 and 2 are functional block diagrams showing an information service system according to the present embodiment. FIG. 1 shows a configuration of a center 10, and FIG. 2 shows a configuration of a user terminal 20. The center 10 and user terminal 20 are provided as computer systems having a CPU, ROM, RAM, input/output and the like.

In the information service system of the present embodiment, the user terminal 20 is loaded on a vehicle and is connected to a navigation apparatus which is not shown to be used for information retrieval. The center 10 and user terminal 20 are connected by an information communication network (not shown) including a wireless network, and the user terminal 20 can communicate data with the center 10 in a so-called mobile environment.

A description will be first made on the center 10 with reference to FIG. 1.

The center 10 has a communication block 11, a profile storing/editing block 12, a profile selection block 13, an information retrieval block 14, a distributed profile generation block 15 and an information database 16. The information database 16 has a profile database 16a and a contents database 16b. The profile database 16a is a database which is constructed from profile information transmitted by each of user terminals 20, and each of the user terminals 20 serves as a source of information. The contents database 16b is a complete data base prepared at the center 10. The source of information of the same is independent from the users' end. Various kinds of information such as information on restaurants, sight-seeing places, amusement parks are stored in the contents database 16b.

The communication block 11 is an interface device for allowing data communication between a plurality of user terminals 20 and the center 10. The center 10 performs data communication with a user terminal 20 when a data communication enabled state is established between itself and the user terminal 20 through the communication block 11. In FIGS. 1 and 2, three user terminals 20 are enabled for data communication with the center 10 through the communication block 11. The number of the user terminals 20 is not limited to three. The communication block 11 receives requests for retrieval from each of the user terminals 20 and profile information transmitted in profiles. It also distributes results of retrieval, information and control data to each of the user terminals 20.

The profile storing/editing block 12 stores profile information from each of the user terminals 20 to the profile database 16a. The profile information is stored in profiles which describe information associated with particular entries. Profiles will be described later. It also edits profile information transmitted thereto, extracts new information from the profile information and stores the same information also in the profile database 16a.

The profile selection block 13 selects a past profile which is similar to a profile transmitted thereto. This selection is carried out by calculating the degree of similarity between profiles. The degree of similarity is determined from the magnitudes of "distances" (to be described later) defined between the profiles.

The information retrieval block 14 retrieves information according to a request for retrieval using the profile database 16a and infers an unknown piece of information included in profile information transmitted thereto based on the profile selected by the profile selection block 13. Information according to a request for retrieval can be also retrieved using the contents database 16b.

The distributed profile generation block 15 generates information retrieved by the information retrieval block 14 as distributed profiles. Results of retrieval, information and control data are distributed to the user terminals 20 in the form of such distributed profiles.

A description on the user terminals 20 will be made with reference to FIG. 2. FIG. 2 shows a configuration of only one of the user terminals 20 because the three user terminals 20 have the same configuration.

A user terminal 20 has a voice recognition dictionary setting block 21, a user interface 22, a profile generation/update block 23, an environment/situation inference block 23a, a request/status inference block 23b, a location/time identification block 23c, a personal information storage block 23d, a profile storage block 24, a missing information detecting block 25, a retrieval request generation block 26, an information retrieval block 27, a profile database 27a, a local contents database 27b, a security check block 28, a communication block 29, a new information acquisition block 30 and a situation detecting block 31.

The user interface 22 has an audio input device for inputting speech information from a user and a speech synthesis device and a display device for notifying the user of retrieved information and the like. The display device may also serve as a device for displaying map data of the navigation apparatus.

In order to allow correct recognition of the contents of a user's speech, the voice recognition dictionary setting block 21 sets a voice recognition dictionary in accordance with the topic at the user interface 22.

The profile generation/update block 23 generates and updates various profiles.

Profiles used in the present embodiment will now be described.

In the present embodiment, four profiles are set, which are an environment/situation profile which describes information associated with the environment and situation around a user, a request/status profile which describes information associated with a request from a user and the status of a user, a user profile which describes personal information of a user and a vehicle status profile which describes the situation of a vehicle on which a user terminal 20 is loaded.

Information described in the environment/situation profile, request/status profile and user profile corresponds to "terminal-side information". That is, those three profiles are transmitted from the user terminals 20 to the center 10.

Such profiles are used because information desired by a user is closely related to the environment and situation of the user, the requests and status of the user and personal characteristics of the user.

First, an environment/situation profile will be described.

Information associated with the following entries is described in an environment/situation profile.

(1) Time information
(2) Present location
(3) Destination
(4) The number of points on the route
(5) Point 1, point 2, . . . on the route
(6) Ambient temperature
(7) Internal temperature
(8) Air-conditional set temperature
(9) Coordinates of the vehicle
(10) Address of the vehicle
(11) Region of the vehicle location
(12) Road category of the vehicle location
(13) Road status of the vehicle location
(14) Traffic environment of the vehicle location
(15) Geographic environment of the vehicle location
(16) General situation
(17) Weather of the present location
(18) Weather of the destination
(19) Traffic status
(20) Situation around the vehicle
(21) Driving state
(22) Purpose of the travel
(23) Subject
(24) Passenger identification
(25) Audio environment
(26) State of speech
(27) Noise environment Each of the entries will now be described.

(1) Time Information

Information of the present season of the year, date and time and time zone is described as time information. The seasonal zones of spring, summer, autumn and winter may be used for the description. Alternatively, smaller divisions may be used for the description. For example, summer may be described using smaller divisions, i.e., early summer and mid summer.

Date and time is described in terms of month, date, hours, minutes and seconds. Time zones are described by dividing a day into early morning, morning, midday, evening, night and midnight.

(2) Present Location, (3) Destination and (5) Points on The route

The present location, destination and points on the route are each described in the form of an address. When there is a plurality of points on the route, a plurality of points on the route are described.

(4) The Number of Points on the Route

When there is a plurality of points on the route, the number of the points is described.

(6) Ambient Temperature, (7) internal Temperature and (8) Air-Conditioner Set Temperature The ambient temperature, internal temperature and air-conditioner set temperature of the vehicle are described as temperature information. The air-conditioner set temperature is a target internal temperature of the vehicle to be achieved by automatic air conditioning.

(9) Coordinates of the Vehicle Location, (10) Address of the Vehicle Location and (11) Region of the Vehicle Location The coordinates of the vehicle location, the address of the vehicle location and the region to which the vehicle location belongs are described as information associated with the location of the vehicle.

The coordinates of the vehicle location are described using a reference area number, an abscissa X and an ordinate Y in a map database of a navigation apparatus. The address of the vehicle location is described using the name of the urban or rural prefecture to which the location belongs, i.e., prefecture, city, town or village. The region of the vehicle location is described using the names of divisions, i.e., Hokkaido, Tohoku, Kanto, Koshin'etsu, Tokai, Hokuriku, Kinki, Chugoku, Shikoku, Kyushu and Okinawa.

(12) Road Category of the Vehicle Location, (13) Road Status of the Vehicle Location, (14) Traffic Environment of the Vehicle Location, (15) Geographic Environment of the Vehicle Location and (16) General Situation The road category of the vehicle location, the road status of the vehicle location, the traffic environment of the vehicle location, the geographic environment of the vehicle location and the general situation are described as information of the environment of the vehicle location.

The road category of the vehicle location is described using categories such as "expressway", "toll road", "national road", "prefectural road", "city road", "town road" and "village road".

The road status of the vehicle location is described as dry, wet, snowy or icy. The road status may be described as "flooded", "flood tide", "falling rocks", "cave-in", "steep slope", "long tunnel", "long bridge" and "consecutive curves" in some occasions.

Information on traffic regulations and traffic status is described as the traffic environment of the vehicle location. Information on traffic regulations is described using specifications "speed limit", "no parking", "no parking/stopping", "one-way traffic", "no turning", "keep the lane", "no passing", "height limit", "width limit" and "weight limit". The traffic status is described as "normal", "crowded" or "jammed".

The geographic environment of the vehicle location is described as "near home", "urban street", "depot street", "neighborhood of home", "neighborhood of destination" or "neighborhood of a point on the route".

The general situation of the vehicle is described using general categories "expressway", "ordinary road", "destination" and "point on the route" and is more specifically described as follows.

In the case of an expressway, more specific descriptions "interchange entrance", "merging", "branching", "service area (hereinafter abbreviated to read "SA")", "parking area (hereinafter abbreviated to read "PA")", "merging traffic ahead", "branching traffic ahead", "toll gate", "left-side lane", "second lane from the left", . . . and "passing lane" are given.

In the case of an ordinary road, more specific descriptions "left-side lane", "passing lane", "intersection", "traffic light", "pedestrian crossing", "foot bridge" and "traffic circle" are given.

At the destination, more specific descriptions "entrance", "exit", "parking lot", "gas station", "convenience store", "fast food", "railway station", "post office", "bank", "SA" and "PA" are given.

At a point on the route, more specific descriptions such as "gas station", "convenience store", "fast food", railway station", "post office", "bank", "SA" and "PA" are given.

(17) Weather of the Present Location and (18) Weather of the Destination

Such weather information is described using terms such as "fine", "cloudy", "light rain", "rain", "heavyrain", "light-snow", "snow", "heavy snow", "thunder", "typhoon", "strong wind" and "dense fog".

(19) Traffic Status

The traffic status is described as "sparse", "normal" or "crowded".

(20) Situation Around the Vehicle

The situation around the vehicle is described in terms of the relationship between surrounding objects and the vehicle, the positions of the surrounding objects relative the vehicle, the traveling direction and speed and the type of the object ahead the vehicle.

The relationship between surrounding objects and the vehicle is described as "leading", "following", "side-by-side", "passing", "being passed", "crossing ahead" and "stationary".

The relative positions of surrounding objects and the vehicle are described as "on the right", "on the left", "ahead the vehicle" and "behind the vehicle", the description being accompanied by coordinate values.

The type of an object is described as "large vehicle", "small vehicle", "motor cycle", "bicycle", "pedestrian", "animal", "fallen article" or the like.

If there is a plurality of vehicles around the vehicle of interest, a plurality of respective descriptions are given to them.

(21) Driving State

The driving state is first generally described as "traveling", "stopped" or "parked".

More specific descriptions are made as follows.

When traveling, the traveling speed is described as "smooth traveling", "beyond speed limit", "jammed" or "temporary stop". For example, the vehicle is judged as beyond a speed limit when it is at a speed of 80 km/h or more on an ordinary road and when at a speed of 120 km/h or more on an expressway. The traveling state is described as to whether there is vibration or not, the magnitude of gravity and the like.

When the vehicle is stopped, more specific descriptions such as "starting soon" and "stopped at pedestrian zone" are given.

When the vehicle is parked, more specific descriptions such as "engine is revolving", "engine is stopped" and "oil is being fed" are given.

(22) Purpose of the Travel

The purpose of the travel is described as "pleasure trip", "shopping", "drive", "dining out", "general movement", "commutation", "going to school", "going to sport", "sending or picking up a person" and "going to hospital" are given.

(23) Subject

Subjects such as "destination", "dining", "neighborhood of the present location", "time", "family", "friends", "music", "navigation", "drive", "shopping", "golf", "ski" are described.

(24) Passenger Identification

Descriptions are made as shown in brackets below to provide passenger identification, i.e., detailed information on the person on each seat.

[SEAT#ID, PSTYPE, PATYPE, PTYPE, PROFILE#ID]

SEAT#ID represents data identifying each seat. SEAT#ID "0" represents the driver's seat. SEAT#ID "1" represents the assistant driver's seat. SEAT#ID "2" represents a rear seat. The passenger indicated by SEAT#ID "0" is the user described in the user profile.

PSTYPE represents data indicating the sex of a passenger. PSTYPE "0" represents something other than a human being such as baggage or an animal. PSTYPE "1" represents a male. PSTYPE "2" represents a female.

PATYPE represents data indicating the age bracket of a passenger. PATYPE "0" represents a baby. PATYPE "1" represents a schoolboy (schoolgirl). PATYPE "2" represents a junior high school student. PATYPE "3" represents a high school student. PATYPE "4" represents a young person. PATYPE "5" represents an adult. PATYPE "6" represents an old person. For example, a young person in this context may be in the age bracket from 19 to 29; an adult may be in the age bracket from 30 to 64; and an old person may be in the age of 65 or more.

PTYPE represents data indicating the type of a passenger. PTYPE "0" represents the driver. PTYPE "1" represents the wife or husband of the driver. PTYPE "2" represents a child of the driver. PTYPE "3" represents a parent of the driver. PTYPE "4" represents a different family member of the driver. PTYPE "5", represents an intimate friend of the driver. PTYPE "6" represents an acquaintance of the driver. PTYPE "7" represents a person of another category.

Further, PROFILE#ID represents data indicating the full name or first name of a passenger.

Therefore, for example, when [SEAT#ID, PSTYPE, PATYPE, PTYPE, PROFILE#ID]=[2, 1, 2, Taro XX], a person named "Taro XX (XX represents the family name)" who is a school boy and who is a child of the driver is seated on a rear seat.

(25) Audio Environment

An audio environment is described in the form of data of 12 bits.

bit-0: cassette
bit-1: CD
bit-2: MD
bit-3: DVD
bit-4: FM broadcast
bit-5: AM broadcast
bit-6: broadcast of a public traffic information center
bit-7: TV
bit-8: VTR
bit-9: telephone
bit-10: reserved
bit-11: reserved The above-described bit assignment has been made, and an audio environment is described by setting or resetting each bit.

(26) Status of Speech

The status of speech is described in the form of data of 5 bits.

bit-0: conversation between a driver and an agent
bit-1: conversation between a driver and the person on the assistant driver's seat
bit-2: conversation between a driver and a person on a rear seat
bit-3: a telephone call to and from a driver
bit-4: other types of conversation The above-described bit assignment has been made, and the status of speech is described by setting or resetting each bit.

(27) Noise Environment

Noises inside and outside of a vehicle are described as high, medium or low as a noise environment.

Entries of an environment/status profile and values of the entries have been described above. An example of description of such a profile is shown below.

EXAMPLE OF DESCRIPTION

| | |
|---|---|
| Date and time: | 11:05:30, Oct. 18, 1998 |
| Attribute of the date: | Sunday/holiday |
| Season: | autumn |
| Time Zone: | before noon |
| Present location: | Kariya City |
| Destination: | Okazaki City |
| Point 1 on the route: | Chiryu City |
| Point 2 on the route: | Anjo City |
| Ambient temperature: | 32.5 |
| Internal temperature: | 34.0 |
| Set temperature: | 24.5 |
| Coordinates of the vehicle location: | reference area number = 17, X = 200.0, Y = 30.0 |
| Address of the vehicle location: | Aioi-cho, Kariya City, Aichi Prefecture |
| Region of the vehicle location: | Chubu region |
| Road category of the vehicle location: | ordinary road |
| Road status of the vehicle location: | normal |
| Traffic environment of the vehicle location: | speed limit |
| Geographic environment of the vehicle location: | Near home, urban road, depot road |
| General situation around the vehicle location: | ordinary road/left-side lane, intersection, traffic light |
| Weather of the vehicle location: | fine |
| Weather of the destination: | rain |
| Traffic status: | sparse |
| Status around the vehicle: | there is a following vehicle |
| State of driving: | traveling/smooth travel |
| Purpose of travel: | pleasure trip, shopping |
| Subject: | dining |
| Passenger identification: | [0, 1, 5, 0, Taro] [2, 2, 5, 1, Hanako] [1, 2, 1, 2, Eri] [2, 2, 0, 2, Yuri] |
| Audio environment: | FM broadcast, TV (bits 4 and 7 are set at "1"). |
| State of speech: | conversation between the driver and an agent, and other conversations (bits 0 and 4 are set at "1") |
| Noise environment: | low internal noises, medium ambient noises |

Next, a request/status profile will be described.

Information associated with the following entries is described in a request/status profile.

(1) Date
(2) Time
(3) User identification name
(4) Present request
(5) Predicted request
(6) Present status
(7) Predicted status
(8) Purpose of the travel
(9) State of driving
(10) State of noises Each entry will now be described (1) Date A date is described in the form of "yyyy (year) mm(month) dd(day)".

(2) Time

Time is described in the form of "hh(hours) mm(minutes) ss(seconds)".

(3) User Identification Name

A user identification name is described in the form of the name of the person, a number, a password or the like.

(4) Present Request

Results of inference of a request of a user at the present time is described based on the mechanisms disclosed in Japanese patent applications Nos. Hei. 10-162457 and Hei. 10-184840, each of which corresponds to United State patent application Ser. No. 09/328,339 filed on Jun. 9, 1999, the contents of which are incorporated herein by reference.

For example, a description is made for a request associated with "route searching", "route guidance", "dining", "rest", "lodging", "parking", "shopping", "play", "singing", "dancing", "taking a picture", "videotaping", "mail reading", "weather information", "skiing", "swimming", "jogging", "golfing", "watching TV", "park", "amusement park", "theme park", "bowling", "internet", "making a phone call", "opening a window", "turning the air-conditioner on", "listening to music" or the like.

(5) Predicted Request

Results of prediction of a request of a user at a point in time in the future are described based on the mechanism disclosed in Japanese patent application No. Hei. 10-184840.

(6) Present Status and (7) Predicted Status

For example, those statuses are described as "normal", "lively", "comfortable", "enjoying driving", "hungry", "eating", "listening to music". "enjoying a TV program or the like", "full stomach", "tired", "wishing to go home", "wishing to reach the destination quickly", "at rest", "irritated", "in a hurry", "angry", "feeling low", "depressed" or "sleepy".

The reason for describing a request and status of a user is that a request is likely to come from a status of the user and that status information facilitates inference of requests. For example, while the status of wishing to go home or to play can be regarded as a request, a need exists for having separate entries for requests and statuses as information because the status of being angry, hungry, irritated or the like can not be regarded as a request. Further, if information on a present status and request is available, it is possible to infer a predicted status and predicted request. Such a predicted request and predicted status are accompanied by a date and time to clearly indicate the point in time in the future predicted by the information.

(8) Purpose of a Travel

The purpose of a travel is described as "pleasure trip", "shopping", "dining", "tour", "none", "personal business", "commutation", "business trip", "recreation" or the like.

Entries of a request/status profile and values of the entries have been described above. An example of description of such a profile is shown below.

EXAMPLE OF DESCRIPTION

Date and time: yyyy/mm/dd
Time: hh:mm:ss
User identification: Taro Aichi
Present request: preparation for dining
Predicted request: park (19981018-14:00), Shopping (19981018-15:00)
Current status: hungry
Predicted status: hungry (19981018-12:00)
Purpose of the travel: pleasure trip, shopping, dining
Status of driving: smooth A user profile will now be described.

Information associated with the following entries is described in a user profile.

(1) Name
(2) Age (3) Address
(4) Family
(5) Profession
(6) Appointment
(7) Favorite foods
(8) Hobbies The entry of hobbies describes not only general categories such as sports and music but also specific kinds of sports and music. An example of description is shown below.

Name: Taro Heisei
Age: 34
Address: XX X-Chome, XX-Cho, XX-City
Family: wife, one daughter, one son
Profession: company employee
Appointment: manager
Favorite foods: Chinese foods, Japanese foods
Hobbies: travel, drive, sports (tennis, jogging, ski), music (popular music, folk music, classic music)

A vehicle status profile will now be described.

Information associated with the following entries is described in a vehicle status profile.
(1) Traveling status
(2) Ignition
(3) Illumination in compartment
(4) Light
(5) Air-conditioning
(6) Automatic transmission (AT) position
(7) Battery
(8) Fuel
(9) Brake
(10) Distance traveled
(11) Vehicle speed, engine speed
(12) Time for oil replacement
(13) Time for compulsory inspection
(14) Time for periodical check
(15) State of windows (open or closed)
(16) Seat belt
(17) State of trunk compartment (open or closed)

The traveling status is described as "traveling" or "stopped". Information on the ignition, illumination in the compartment, light and air-conditioning is described as on/off information on such functions.

A description has been made on the names of entries of profiles used in the present embodiment and entry values which are information associated with such entries.

Each of the above-described profiles is constituted by a header and a group of entry registers.

A header is provided for allowing identification of the type of a profile when it is stored, transmitted or received.

An entry register is constituted by the following components.
(1) Time of update
(2) Status flag, reliability rank
(3) Permission
(4) Name of entry
(5) Entry value
(6) Source of information (originator)

The above description applies to the name of entry and the entry value. In addition to the name of the entry and the entry value, information of time of update, the status flag, the reliability rank, permission, the source of information (originator) is allocated to each of the entries.

A point in time at which the contents of an entry have been updated is described as the time of update.

A status flag is a flag to allow determination on whether an entry value is known or not. The entry value is unknown if the flag=0. The entry value is being retrieved if the flag=1. The entry value is known if the flag=2.

A reliability rank is a rank indicating the reliability of known information. Such a reliability rank changes as time passes in the case of dynamic information. In the present embodiment, such a rank is calculated at the center.

Permission is information to prevent transmission of private informationtothecenterwhich-isprimarilysetforentriesofuserprofiles. Such permission information is described in the form of data of one bit. Transmission is not permitted if the bit=0 and permitted if the bit=1.

For example, let us assume that a user profile is described as follows.

Favorite foods: 1: beef stake, Chinese foods
Family make-up: 0: wife, one daughter, one son
Destination: 1: Aichi Seishonen Park In this case, the family make-up will not be transmitted to the center.

A provider or originator of information or the like is described as the source of information.

Data structures of various profiles have been described above.

The profile generation/update block 23 of the user terminal 20 shown in FIG. 2 will now be described.

The profile generation/update block 23 generates four profiles as described above. However, not all of the entry values of the profiles are known.

The profile generation/update block 23 therefore refers to past profiles stored in the profile database 27a to infer unknown entry values as much as possible. At this time, the entry values of the environment/situation profile are inferred by the environment/situation inference block 23a, and the entry values of the request/status profile are inferred by the request/status inference block 23b. The location/time inference block 23c identifies the location of the vehicle from information supplied by the navigation apparatus which is not shown and identifies the time. Further, personal information of the user is stored in the personal information storage block 23d in advance, and a user profile as described above is generated based on the same. Information from various sensors and the like loaded on the vehicle is input through the status detection block 31 to the profile generation/update block 23. The environment/situation profile and the vehicle status profile are generated based on the information.

Information transmitted by the center 10 is input to the profile generation/update block 23 through the new information acquisition block 30, and the profiles are updated based on this information.

The profile storage block 24 stores generated or updated profiles in the profile database 27a. This allows profile information described in the past to be reused.

The missing information detecting block 25 detects entries required for generating a request for retrieval from among unknown entries in a profile as missing information. When there is any missing information, a query is issued to the user through the user interface 22, and the profile generation/update block 23 identifies the missing information from verbal information from the user input through the user interface 22 to update the profile.

The retrieval request generation block 26 generates requests for retrieval based on profile information. The retrieval request generation block 26 can generate both of a request for retrieval to be transmitted to the center 10 and a request for retrieval to be used for retrieval in the user terminal 20.

Based on a request for retrieval generated by the retrieval request generation block 26, the information retrieval block 27 retrieves information according to the request for retrieval from the profile database 27*a* and local contents database 27*b*.

The security check block 28 refers to the permission to the above-described profiles to screen data for which transmission is inhibited.

The communication block 29 transmits the profile information from the security check block 28 and the request for retrieval from the retrieval request generation block 26 to the center 10. The communication block 29 also receives the results of retrieval, information and control data from the center 10. The received information is edited by the new information acquisition block 30 and is transmitted to the user interface 22, profile generation/update block 23 and local contents database 27*b*. For example, the results of retrieval are transmitted and notified to the user interface 22. The local contents database 27*b* is updated with the information thus received.

An operation of the information service system of the present embodiment will now be described.

Figure 3:
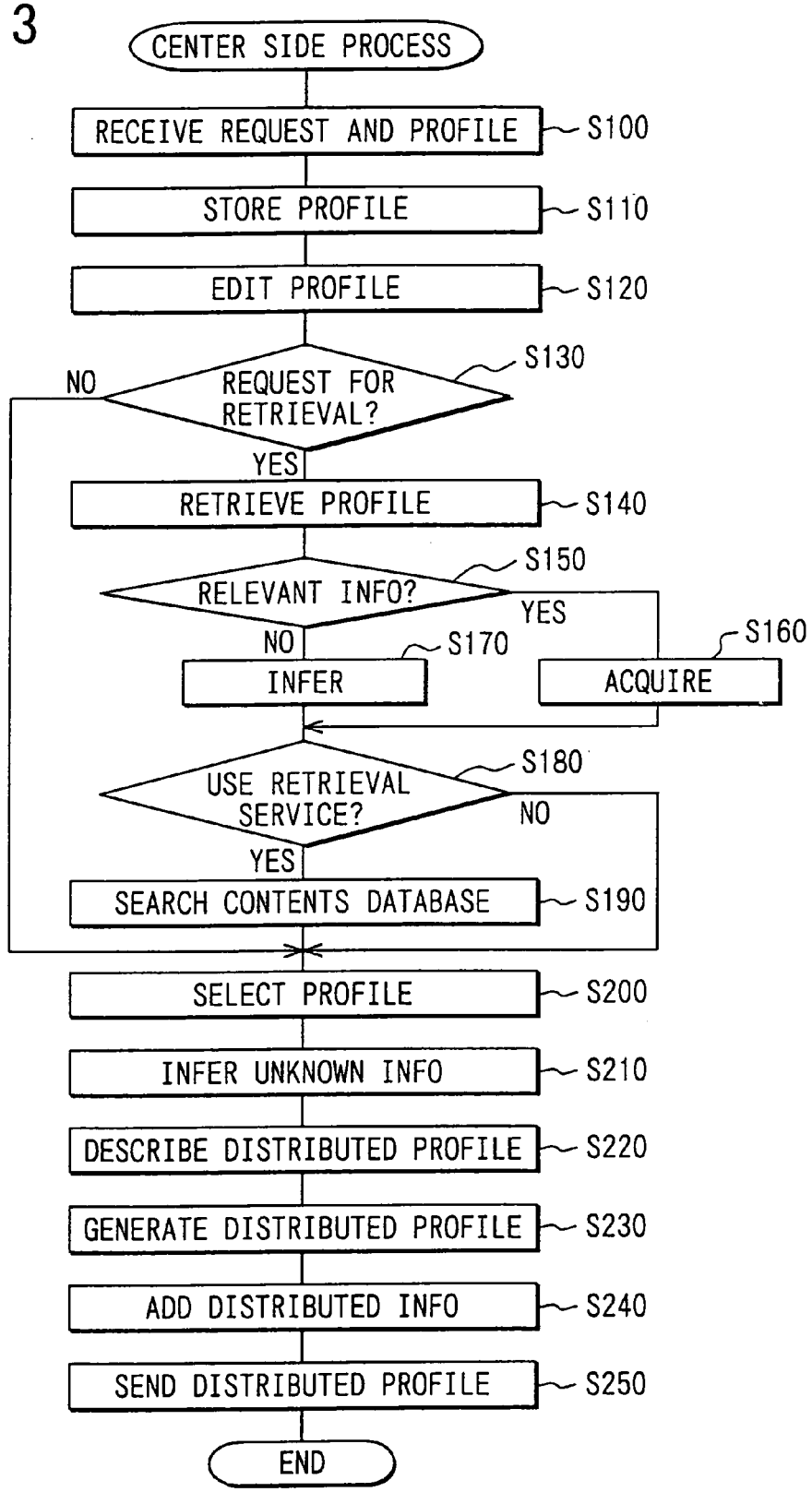
FIG. 3 is a flow chart showing a center-side process executed at the center.

A description will be first made on a center-side process executed by the center 10 based on the flow chart shown in FIG. 3.

First, a request for retrieval and profiles are received at step S100. This process is to receive information transmitted by the communication block 29 of a user terminal 20 through the communication block 11 of the center 10. A request for retrieval does not necessarily exist. Therefore, at least profiles are received at this time. The received profiles are three profiles, i.e., an environment/situation profile, a request/status profile and a user profile as described above.

At the next step S110, the received profiles are stored. Each of the profiles is stored along with a header indicating the user name, date and time and the user location.

At the next step S120, the received profile information is edited to extract secondary information based on the profile information where the profile information is regarded as primary information. Such secondary information is also added to the profile database 16*a*.

By editing profiles from a plurality of users in such a manner, an event database with high integrity can be automatically constructed.

For example, traffic jams (secondary information) can be predicted by receiving and editing information on destinations of driving (primary information) from a multiplicity of users at the center. By editing particular information, it is possible to perform real-time extraction of information on local weather which is not available from the existing weather information, traffic statuses, road statuses and the like. For example, when information on local weather is extracted as secondary information, information on locations, time, the weather of the present locations and the like described in environment/situation profiles is edited. At this time, the weather information may include source information that indicates the weather information originates from sensor outputs or the users' subjective observation. For example, it is possible to indicate the degree of inclusion of the users' subjective observation by defining in advance that source information is information based on a human evaluation if it has a value "1" and that source information is information based on a sensor output if it has a value "0". Similarly, in the case of a traffic status, information on locations, time, traffic statuses and the like described in environment/situation profiles is edited. In the case of a road status, information on locations, time, road statuses and the like described in environment/situation profiles is edited.

Rules for statistical inference may be extracted as secondary information. For example, information such as "XX Café is crowded on Saturday afternoon", "Traffic jams occur near ZZ intersection from 7 to 10 in weekday mornings" and "the road at point xxx on yyy expressway is slippery" may be extracted.

Each piece of information is ranked in terms of reliability. The ranking is carried out based on a comprehensive judgment of the reliability of the information providers and the reliability of data from which the information originates. For example, the reliability of an information provider is judged from the number of times the provider has provided information based on the user ID of user profiles transmitted in the past. Referring to the reliability of data, when weather information of a particular location is desired, the reliability of data is judged by checking whether the data has been obtained in a location near the location of interest or whether the data is obtained at a point in time close to the point in time of interest.

While information from user terminals 20 is accumulated at the center 10, the period of accumulation is set in advance depending on the storage capacity of the center 10, and pieces of obsolete information are sequentially deleted.

The processes at steps S110 and S120 correspond to the above-described process at the profile storing/editing block 12.

It is determined at the next step S130 whether there is any request for retrieval. That is, it is determined whether any request for retrieval has been received along with profile information. If it is determined here that there is a request for retrieval (step S130 has an answer "YES"), the process proceeds to step S140. If it is determined that there is no request for retrieval (step S130 has an answer "NO"), the process proceeds to step S200.

Step S140 retrieves information that satisfies the request for retrieval. This retrieval process is performed on the profile database 16*a* using information transmitted as profiles.

The retrieval from the profile database 16*a* may be time-oriented retrieval, location-oriented retrieval, retrieval of weather information or retrieval to a request.

Time-oriented retrieval may further involve retrieval aimed at profiles from particular members (e.g., acquaintances) and retrieval of limited objects for retrieval. For example, when users enjoy driving of a plurality of cars, retrieval may be performed to know the location where a particular friend is presently traveling. Retrieval may also be performed to know which restaurants are crowded at certain time.

Location-oriented retrieval may be combined with time-oriented retrieval. For example, the weather, traffic jams, road statuses at the present point in time may be retrieved.

Weather-oriented retrieval may involve, for example, retrieval of profiles including information on weather around the destination at the present time and retrieval of profiles associated with a particular location at the same period obtained in the last few years. For example, the later retrieval will provide statistical information such as "weather is likely to break around xxx in Hokkaido in the middle of August".

Retrieval to a request is retrieval of restaurants, pleasure resorts, facility and the like which are popular.

Techniques for retrieval utilizing voice recognition have been disclosed in Japanese patent application Nos. Hei. 10-162457, Hei. 10-184840 and Hei. 11-20349 that corresponds to United State patent applications Ser. No. 09/490,442 filed on Jan. 24, 2000, the contents of which are incorporated herein by reference.

It is determined at step S150 whether information relevant to the request for retrieval exists in the profile database or not. If there is relevant information, the information is acquired at step S160, and the process proceeds to step S180. If there is no relevant information, the information is inferred and acquired at step S170, and the process proceeds to step S180. It is determined that there is no relevant information, for example, when the request for retrieval is constituted by a keyword and the retrieval does not reach any information that is directly associated therewith. In this case, an inference is made on the word string to infer and acquire information which is optimum for the request for retrieval. This method has been disclosed in Japanese patent application No. Hei. 11-20349.

It is determined at step S180 whether to use a retrieval service or not. The database made available by the retrieval service in this context is the above-described contents database 16b. In general, formation charges set for the contents database 16b are higher than those set for the profile database 16a because the source of information of the same is not the user terminals 20. In the present embodiment, therefore, setting is made in advance for each user as to whether to use this retrieval service. For example, the IDs of users who have made a contact to use the retrieval service may be stored. If the retrieval service is used (step S180 has an answer "YES"), the contents database 16b is searched at step S190 to acquire information in accordance the request for retrieval if any. The process then proceeds to step S200. If the retrieval service is not used (step S180 has an answer "NO"), the process proceeds to step S200 without performing the retrieval process at step S190.

At step S200 which follows step S130 or step S180 in the case of the negative determination or which follows step S190, profiles similar to the transmitted profiles are selected to identify entry values which are unknown in the transmitted profiles.

The selection of similar profiles is carried out by defining distances between the profiles.

A distance L between two different profiles Pm and Pn is defined by the following equation.

$$L(Pm,Pn)=\Sigma wi \cdot d(s(i), Aim, Ain)$$

A description of the parameters follows.

Aij: the entry value of an s(i)-th entry of Pj d(a, b, c): a function that defines the distance between entry values a and b for an s-th entry s(I): an identification number of an I-th register selected from among registers in Pj N: number of activated registers wi: weight factor The above sum symbol $\Sigma$ represents the sum of n=1 through N.

That is, the distance is defined as the sum of distances between entry values in activated registers. The activation will be described later.

First, a case will be discussed in which a user retrieves his or her own profiles.

While user profiles describe static information, environment/situation profiles and request/status profiles describe information which depends on locations and time. Therefore, a user may retrieve profiles associated with similar statuses of himself or herself in the past accumulated at the center 10.

For example, when past profiles are to be retrieved before starting a drive, three profiles or so which are at the smallest distance L from a profile of interest may be selected where the distance L is calculated by checking whether the profiles are close to each other in terms of the described days of the week, whether the profiles are described on a holiday or not, whether the dates of the described yearly event or personal memorial day agree with each other, whether the described dates, time zones, present locations, destinations are close to each other, whether the described purposes of driving are similar or not and so on provided that the described user names agree with each other. Unknown pieces of information are inferred based on them.

For example, the closeness of two days of the week y1 and y2 can be mathematically described as a distance by calculating the distance DY between them using the following equations where Sunday through Saturday are associated with numerals 0 through 6.

$$DY=\min(ADY, 7-ADY), ADY=|y1-y2|$$

Since the pattern of activities on Sundays which are holidays is likely to differ from that in weekdays, a correction may be made to set a distance DY=10 between Sunday and Tuesday, Wednesday and Thursday. Further, since one's consciousness about days of the week significantly depends on his or her way of life, all relationships in distance between the present day of the week y1 and the days of the week y2 to be retrieved may be defined in the form of a matrix.

In order to calculate such distances, information on holidays, yearly events, memorial days and the like may be described in the user profile.

For example, a user may describe holidays and consecutive holidays of his or her company, holidays on calendar, company memorial days and personal vacations as holidays based on his or her personal way of life. Yearly events (Christmas, Gion-Matsuri, New Year's Day and the like) on fixed dates and memorial days (wedding anniversary, birthdays of children and the like) may be described as yearly events and memorial days. Referring to a distance calculation associated with a yearly event or memorial day, a small distance may be set between the day of interest and the seven preceding days, and the number of days to go before the same day in the next year may be used as the distance after the event is finished.

Referring to distance calculations as described above, in the case of dates, the absolute difference between the dates is simply calculated in terms of the number of days if there is no special influence of any yearly event. In the case of time zones, the difference between the points in time is simply calculated in terms of hours if there is no special influence of any schedule. In the case of present locations, the physical difference is simply regarded as the distance if there is no special influence of destinations, pleasure resorts, familiar places (user's own house, user's company, park, department store and the like). This equally applies to destinations. Referring to the purposes of driving, predetermined categories are prepared in advance; a relatively small distance is defined between different purposes in the same category (e.g., cherry blossom viewing and visiting a park in the category of leisure); and a greater distance is defined between purposes belonging to different categories (e.g., commutation and skiing).

Retrieval of other users' profiles will now be discussed.

When the results of retrieval of a user's own profiles in the above is not so adequate (i.e., the distance L is very large or is beyond a threshold), other users' profiles may be retrieved. In this case, however, differences between the user names (differences between the user and other users) are reflected in distance calculations as described above.

At step S210, unknown information is inferred. For example, when the unknown information is the weather of a destination, the weather information is inferred as follows.

Weather information is described as "very fine", "fine", "cloudy", "light rain", "rain" "heavy rain" and so on as described. The descriptions are first converted into natural numbers (weather levels) "1" through "10" indicating weather. Here, the greater the number, the finer the weather. For example, the description "very fine" is converted into "10", and the descriptions "strong wind" and "heavy rain" are converted into "1".

Let us assume here that selection of similar profiles to know the weather at a destination A1 has resulted in retrieval of profiles in which the following pieces of information are described.

User R1: at point K1, fine, 15:20
User R2: at point K2, very fine, 13:20
User R3: at point K3, cloudy, 15:50

Let us also assume that information collected at the center 10 includes:

the Weather Bureau weather information: throughout XX City, fine, 14:30

Then, information on the weather of the destination A1 at the present time is inferred using the following three equations. The left side L of the first equation indicates the weather level of the destination.

$$L = AINT(RL)$$

$$RL = (1/P) \Sigma f(t-tn) \cdot Cn \cdot E(A1, Kn) \cdot Ln$$

$$P = \Sigma f(t-tn) \cdot Cn \cdot E(A1, Kn)$$

where t represents the present time; tn represents the time of acquisition of information from a user Rn; AINT(X) represents the integer closest to X; N represents the number of users who have provided information; f(x) represents a monotonically decreasing function for time x (f(0)= 1, and f(∞)=0. This function is associated with the freshness of provided data); Cn represents the credibility of information provided by a user Rn which has a value from 1 to 0, the value n=0 corresponding to the Weather Bureau and resulting in C0=1; E(a, b) represents reliability of substitution of the information of a point "b" for the information of a point "a"; and Ln represents the level of weather information from a user Rn.

The above sum symbol Σ represents the sum of n=0 through N.

At the subsequent step S220, a distributed profile is described. Results of the above-described retrieval, inference made on the unknown information, new information obtained by editing the profile information (secondary information) and control data are described in the distributed profile. The control data may be data for providing notification based on the new information.

At the subsequent step S230, a distributed profile is generated. Datafortransmissionsuchasheaderinformationareaddedtothedistributed profile described at step S220 to generate a profile.

The processes at the above-described steps S140, S190 and S210 correspond to the process at the information retrieval block 14, and the process at step S200 corresponds to the process at the profile selection block 13. The processes at steps S220 and S230 correspond to the process at the distributed profile generation block 15.

At the subsequent step S240, distributed information is added to the profile database 16a. The distributed information is constituted by the results of retrieval, the inference made on the unknown information and the like. The integrity of the information database 16 can be improved by adding such results of retrieval and the inference made on the unknown information to the profile database 16a.

At the next step S250, the distributed profile is distributed to the user terminal 20. This process corresponds to the process at the communication block 11.

A terminal side process performed at a user terminal 20 will now be described with reference to the flow charts shown in FIGS. 4 and 5.

At step S300, profiles are first initialized. As described above, entry values of particular entries are described in each of the profiles. Here, vacant profiles for describing such information are prepared. Specifically, an area for describing each profile is reserved on a memory.

At the subsequent step S310, a voice recognition dictionary is set. As described later, the user terminal 20 performs a process of issuing a query on information required for retrieval among unknown information to the user. Therefore, a dictionary is set which can easily recognize the contents of a predicted speech of the user in response to the query process. The voice recognition dictionary is stored in the voice recognition dictionary setting block 21 shown in FIG. 2.

At the subsequent step S320, user input is accepted. This process is to fetch verbal information from the user through the user interface 22.

At the subsequent step S330, the memory of personal information is referred to. As described above, personal information is stored in advance in the personal information storage block 23d of the user terminal 20. Such personal information is read. When there is a plural piece of personal information, for example, identification is carried out by having the user to input a secret code or a name before starting the process.

At the subsequent step S340, the environment and situation are inferred. This process infers unknown entries of the environment/situation profile and corresponds to the process at the environment/situation inference block 23a.

Similarly, requests and statuses are inferred at the subsequent step S350. This process infers unknown entries of the request/status profile and corresponds to the process at the request/status inference block 23b.

For example, requests and statuses can be inferred from the environment and situation. Specific techniques for this purpose are disclosed in Japanese patent application Nos. Hei. 10-162457 and Hei. 10-184840. For example, a "commuting hasty" status can be inferred on a weekday morning. Requests for "shopping" and "pleasure trip" can be inferred on a holiday afternoon. Similarly, inference will results in requests/statuses with expressions such as "tired" and "wanting to go home soon" on the way home after work in a weekday midnight and requests/statuses with expressions such as "happy", "anticipating", "concerned about leaving something" and "what is the weather like?" in the case of long consecutive holidays or an overnight drive with family.

At the subsequent step S360, the location and time are identified. This process is to identify the vehicle location and the present time using functions of the navigation apparatus. This corresponds to the process of the location/time identification block 23c.

At the next step S370, the profile database 27a of the user terminal 20 is referred to. Here, a further inference is made on the environment and situation of the user and requests and status of the user based on past profile information stored in the profile database 27*a*.

For example, a profile having the highest similarity in terms of the user name, the name of the present location, the name of the destination, the time and the like is selected from the history, and entry values in the profile are transferred.

At the next step S380, the profile is updated (generated). This process corresponds to the process at the profile generation/update block 23 in FIG. 2. Thereafter, at step S390, the generated or updated profile is stored in the profile database 27*a* of the user terminal 20. This process corresponds to the process at the profile storage block 24 in FIG. 2.

At the subsequent step S400, activation levels of the entry registers of each profile are determined depending on the contents of a speech of the user. The activation is to set particular entries as essential entries. Entry registers to be activated and activation levels therefore are determined based on a table which is prepared in advance. Therefore, subjects of speech, entry registers to be activated and activation levels therefor are described on this table in association with each other. For example, subjects of speech are described using units such as "dining", "traffic" and "pleasure trip". For the subject "dining", entries such as the time information, present location, destination and points on the route in the environment/situation profile are described as entries to be activated. Three activation levels, i.e., levels 1 through 3 are described for the entries to be activated. The level 1 indicates that an entry is directly associated with the subject. The level 2 indicates that an entry is required to develop the subject. The level 3 indicates that an entry is required to support driving.

At the next step S410, some entry registers of the profiles are actually activated, and the levels 1 through 3 are set for the activated entries. At the subsequent step S420, entry values which do not satisfy predetermined conditions among entry values associated with entries set at the level 1 are detected as missing information. The missing information which predetermined conditions are not satisfied, for example, when an entry value is unknown or when information is very old or quite unconvincing.

The processes at steps S400 through S420 correspond to the process at the missing information detecting block 25.

It is determined at the next step S430 whether a retrieval process is to be performed or not. Settings for enabling and disabling the retrieval process can be switched in advance on a system setting menu. When no retrieval process is executed (step S430 has an answer "NO"), a display/audio output is provided at step S440, and the process is repeated from step S310. The display/audio output may be a query which prompts a user input. As a result, the profile information is supplemented. When a retrieval process is to be executed (step S430 has an answer "YES"), the process proceeds to step S450 shown in FIG. 5.

Figure 4:
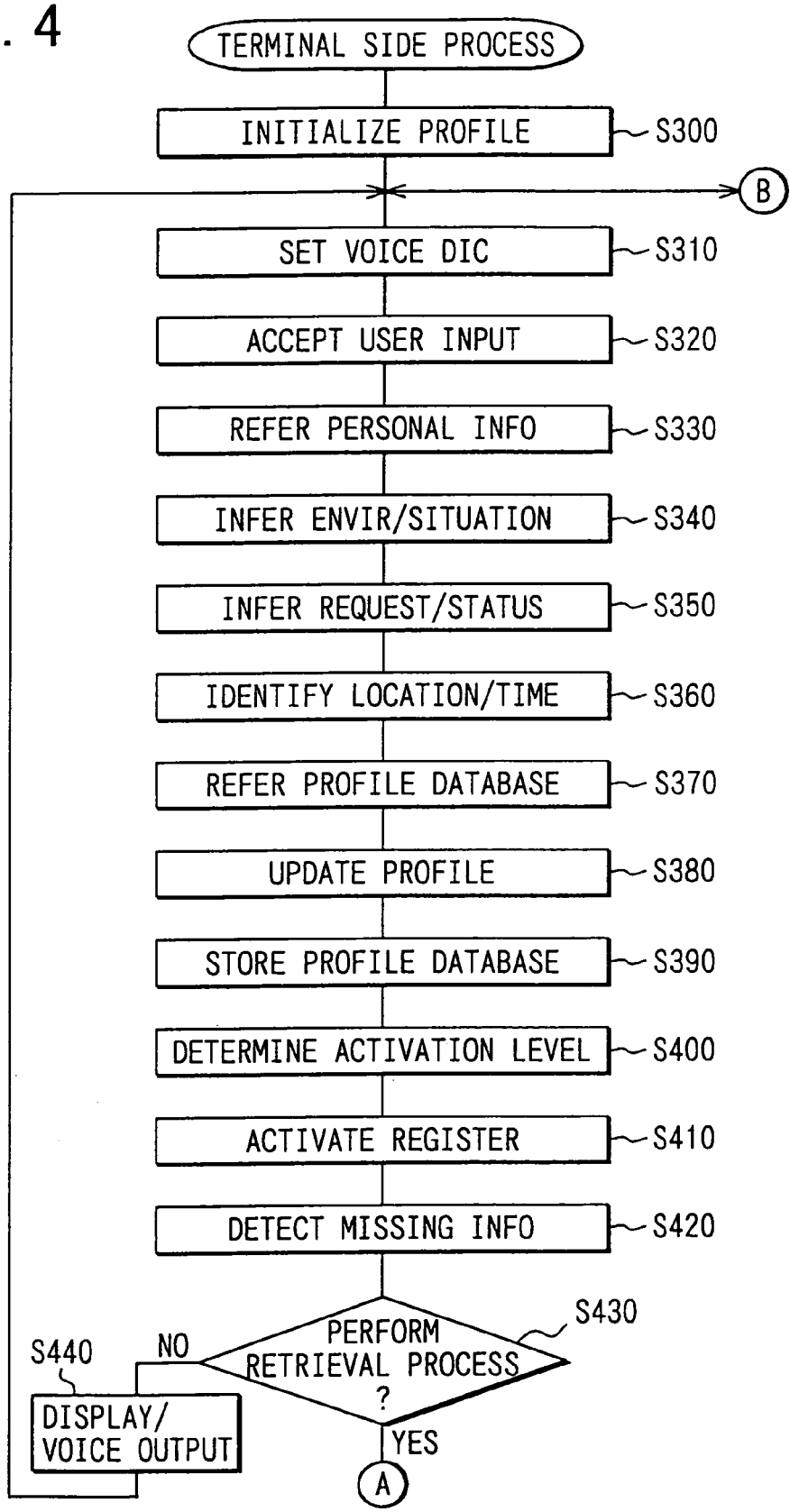
FIG. 4 is a flow chart showing a first half of a terminal-side process executed at the user terminal.
Figure 5:
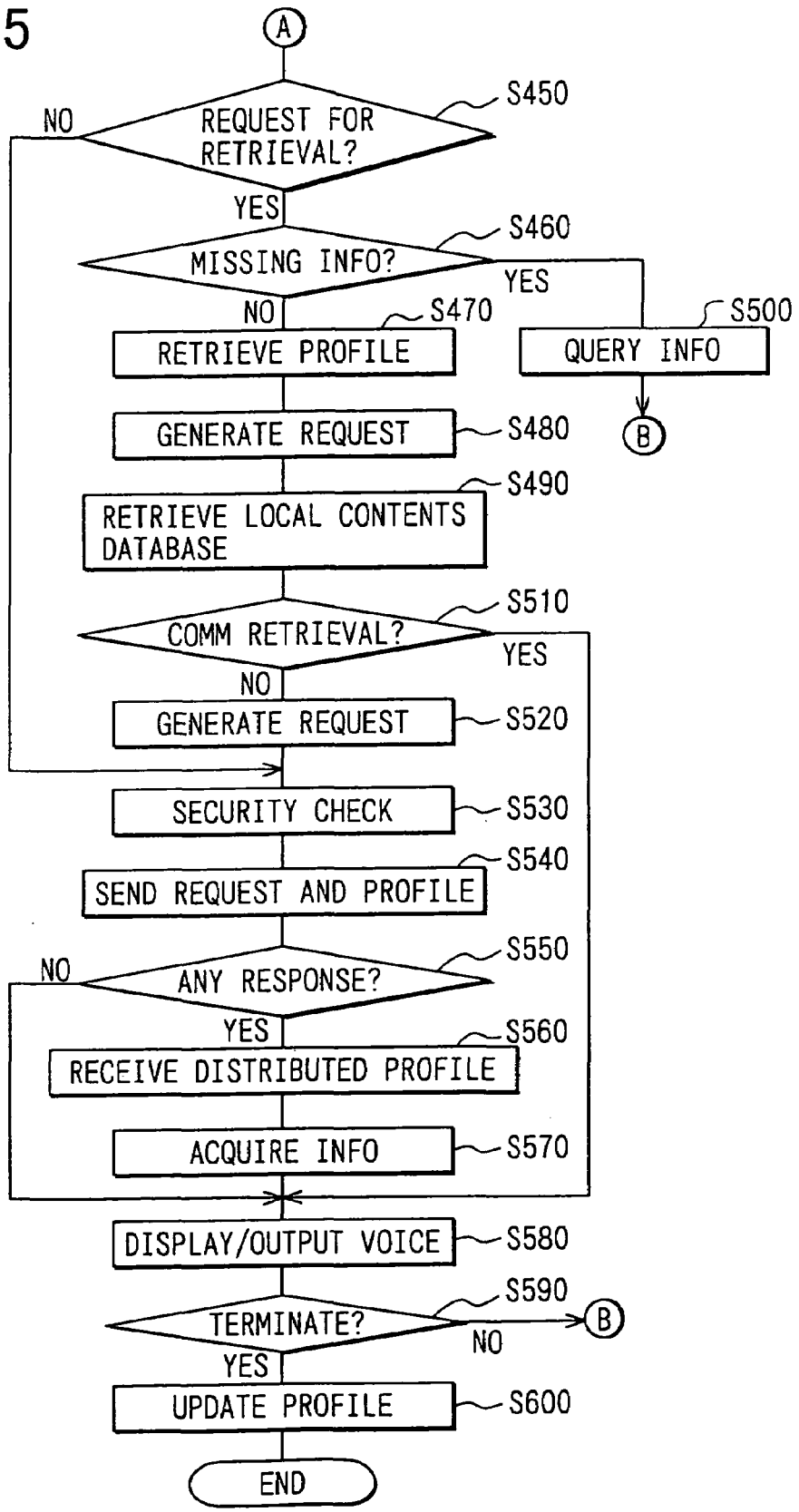
FIG. 5 is a flowchart showing a second half of the terminal-side process executed at the user terminal.

It is determined at step S450 in FIG. 5 whether the generated or updated profile includes any request for retrieval. A request for retrieval is an explicit request for retrieval from the user. For example, when the user makes a statement such as "I wish to find a restaurant" or "I want to know the status of traffic up to the destination" at step S320 in FIG. 4, it is regarded as a request for retrieval. If it is determined that there is no request for retrieval (step S450 has an answer "NO"), the process proceeds to step S530. If it is determined that there is a request for retrieval (step S450 has an answer "YES"), the process proceeds to step S460.

It is determined at step S460 whether there is any missing information. This determination process is performed based on the result of the detection at step S420. That is, a positive determination is made when any missing information is detected at step S420. When there is missing information (step S460 has an answer "YES"), a query about the missing information is issued through the user interface 22 at step S500, and the process is thereafter repeated from step S310 shown in FIG. 4. If there is no missing information (step S460 has an answer "NO"), the process proceeds to step S470.

At step S470, information associated with the request for retrieval is retrieved from the profile database 27*a*. At step S480, a request for retrieval is generated to enable retrieval of the local contents database 27*b*. At the next step S490, information associated with the request for retrieval is retrieved from the local contents database 27*b*.

The processes at steps S470 through S490 correspond to a retrieval process in the user terminal 20. It is determined at step S510 whether communication retrieval is to be performed or not. Specifically, it is determined whether retrieval is to be performed or not at the center 10. Settings for enabling and disabling communication retrieval can be switched in advance on the system setting menu. When communication retrieval is to be performed (step S510 has an answer "YES"), the process proceeds to step S520. If no communication retrieval is to be performed (step S510 has an answer "NO"), the process proceeds to step S580.

Step S520 generates a request for retrieval to be used for communication retrieval.

At step S530 which is reached from step S520 or reached from S450 in the case of a negative determination, security check is carried out. The security check is a process of screening pieces of information inhibited from transmission whose respective entry registers have permission set at "0" and for excluding them from objects to be transmitted. The process at step S530 is the process at the security check block 28 of the user terminal 20.

At step S540, the request for retrieval generated at step S520 is transmitted along with profiles. As described above, the profiles transmitted are three profiles, i.e., an environment/situation profile, a request/status profile and a user profile. The transmission process at step S540 corresponds to the reception process at step S100 in FIG. 3.

It is determined at step S550 whether there is any response from the center 10. A positive determination is made here when the distribution process at step S250 in FIG. 3 is performed. When there is any response (step S550 has an answer "YES"), the profiles are received at step S560; information is then acquired at step S570; and the process then proceeds to step S580. If there is no response (step S550 has an answer "NO"), the process proceeds to step S580 without executing the processes at steps S560 and S570. The processes at steps S540 and S560 correspond to the process at the communication block 29, and the process at step S570 corresponds to the process at the new information acquisition block 30 (see FIG. 2).

At step S580, a display/audio output is provided. This process provides the user with information based on the information acquired at step S570. For example, a result of retrieval, e.g., "XX restaurant is located 1 km ahead on the left" may be notified.

It is determined at step S590 whether to terminate the process or not. If there is no instruction for termination from the user (step S590 has an answer "NO"), the process proceeds to step S310 in FIG. 4. If there is an instruction for termination (step S590 has an answer "YES"), the process proceeds to step S600.

At step S600, the profiles are updated based on the received information, and the terminal-side process is thereafter terminated. The process at step S600 corresponds to the process at the profile generation/update block 23.

The profile storing/editing block 12 of the center 10 of the present embodiment corresponds to the "database construction means". The profile selection block 13 and information retrieval block 14 correspond to the "retrieval means". The distributed profile generation block 15 and communication block 11 correspond to the "distribution means".

The processes at steps S110 and S120 in FIG. 3 correspond to a process as the database construction means. The processes at steps S130 through S210 correspond to a process as the retrieval means. The processes at steps S220, S230 and S250 correspond to a process as the distribution means.

The user interface 22 of the user terminal 20 of the present embodiment corresponds to the "input means" and the "query means". The situation detecting block 31 corresponds to the "situation detecting means" The profile generation/update block 23 corresponds to the "terminal-side information generation means". The profile storing/editing block 24 and communication block 29 correspond to the "storage and transmission means". The missing information detecting block 25 corresponds to the "priority setting means".

The process at step S320 in FIG. 4 corresponds to a process as the input means, and the process at step S500 corresponds to a process as the query means. The processes at steps S330 through 380 correspond to a process as the terminal-side information generation means. The processes at steps S390 and S540 correspond to a process as the storage and transmission means. The process at step S580 corresponds to a process as the process execution means. Further, the processes at steps S410 and S420 correspond to a process as the priority setting means.

Effects of the information service system of the present embodiment will now be described. For easier understanding of the description, problems with the prior art will be described first.

Systems have been proposed and implemented in which a center is accessed using a user terminal to retrieve information. However, they have had the following problems.

(1) In order to retrieve desired information, a user terminal may request the center to retrieve the information using, for example, keywords as conditions for retrieval. It has been difficult to set such conditions for retrieval because a great number of keywords must be input to retrieve desired information exactly.

(2) An enormous amount of time and labor needed to construct an information database at the center results in relatively high information charges.

(3) The difficulty of real-time updating of the information database at the center increases with the ratio of the amount of rapidly changing dynamic information present in the database.

On the contrary, in the information service system of the present embodiment, the source of information for constructing the information database 16 at the center 10 is the plurality of user terminals 20. In other words, the information database 16 at the center 10 is constructed based on profile information transmitted by the user terminals 20. More specifically, the profile database 16a of the information database 16 is added with profiles. The information database 16 is therefore semi-automatically constructed, which reduces time and labor required for construction. Further, information is provided by users themselves. As a result, information charges to be paid by the users for acquired information can be quite inexpensive.

Further, the information database 16 can be updated on a nearly real-time basis by reducing information transmission periods of the user terminals 20 or increasing the number of the user terminals 20. That is, the problems mentioned in the above items (2) and (3) can be solved in the information service system of the present embodiment.

Profile information used for retrieval includes not only verbal information from a user input with the user interface 22 of the user terminal 20 but also situation information input through the situation detecting block 31. The center 10 retrieves information using the profile information. Therefore, in response to a request for retrieval, information which agrees with or which is assumed to agree with the request for retrieval can be provided. For example, this eliminates the need for inputting a great number of keywords as conditions for retrieval. Therefore, the problem mentioned in the above item (1) can be solved in the information service system of the present embodiment.

In the information service system of the present embodiment, the profile storing/editing block 12 of the center 10 edits profile information and adds information based on the result of the edition to the profile database 16a (step S120 in FIG. 3). This is advantageous for users in that they can access a wider variety of information through the user terminal 20.

In the information service system of the present embodiment, the profile generation/update block 23 of the user terminal 20 generates four profiles, i.e., an environment/situation profile, a request/status profile, a user profile and a vehicle status profile (step S380 in FIG. 4). The environment/situation profile, request/status profile and user profile are transmitted to the center 10 (step S540 in FIG. 5). This makes it possible to edit a certain entry on the basis of profiles unlike a case wherein various kinds of information are transmitted by the user terminals 20 (step S120 in FIG. 3). Since entry values associated with predetermined entries are described in profiles, the integrity of the profile database 16a of the information database 16 can be improved.

The user terminal 20 of the information service system of the present embodiment refers to past profiles stored in the profile database 27a(step S370 in FIG. 4) to generate a profile (step S380). It also generates a profile (step S380) based on information from the environment/situation inference block 23a, request/status inference block 23b, location/time identification block 23c and personal information storage block 23d (steps S330 through S360). That is, past profiles are stored, and unknown information is inferred by retrieving profiles that describe similar situations. This makes it possible to enhance profile information without increasing input operations of users.

However, in the closed environment of the user terminal 20, there is some limit on inference of unknown information included in profiles. For example, weather information or the like can be inferred only with low reliability even if reference is made to past profiles.

Under such circumstances, in the information service system of the present embodiment, the profile selection block 13 of the center 10 selects profiles similar to a profile transmitted by a user terminal 20 from among past profiles stored in the profile database 16a of the information database 16 (step S200 in FIG. 3). The information retrieval block 14 infers unknown information based on the selected profiles (step S210). This allows a further reduction of user inputs.

When such similar past profiles are selected, distances between the profiles are defined, and the profile at the smallest distance is selected. The data management on the basis of profiles disclosed in the present embodiment is also advantageous in carrying out such distance calculations.

The inference of unknown information included in profiles at the center 10 makes it possible to reduce the amount of information to be input by users, and this is also very much convenient for users in that some entries can be inferred with a certain degree of accuracy.

In the information service system of the present embodiment, entry registers in profiles are activated depending on subjects and activation levels 1 through 3 are set for them (steps S400 and S410 in FIG. 4). Entries set at the level 1 which are essential as conditions for retrieval are detected missing information (step S420). If there is any missing information (step S460 has an answer "YES"), a query on the information is made (step S500) to prompt the user to input the same. This improves the reliability of information associated with entries which are essential as conditions for retrieval and increases the likelihood of retrieval of information adequate for a request for retrieval.

The present invention is not limited to such an embodiment and may be implemented in various modes without departing the principle of the invention.

(1) Information other than that described in the embodiment may be adapted as entries of profiles. Further, new entries defined by a user may be added to the entries of profiles. In this case, when a profile having newly added entries is transmitted from a certain user terminal 20 to the center 10, a configuration may be employed in which information including control data required for a query process on the added entries is distributed to other user terminals 20 to collect similar information also from the other user terminals 20.

Referring to information other than the above-described entries, three-dimensional information on buildings, scenery and road environments, information obtained by sensing functions of automobiles (road characteristics), video information acquired with video cameras, on-vehicle cameras and the like may be employed as profile entries.

In this case, for example, such information is formed into a database at the center 10 as information or an event mapped to a map or three-dimensional virtual world similarly to the video database disclosed in Japanese patent application No. Hei. 9-292962 filed on Oct. 24, 1997, the contents of which are incorporated herein by reference, and is exchanged between users.

Such an arrangement allows supporting of environment recognition as described below.

For example, a technique has been proposed which allows recognition of structures ahead a vehicle by photographing them with a camera or the like. However, it is considerably difficult to clearly discriminate objects of interest such as human beings and vehicles from other objects with existing recognition techniques. By storing information of three-dimensional structures of fixed environments (buildings, roads, mountain and the like) to serve as a background in advance in combination with the position of the user, the objects can be very efficiently recognized through signal processing. It is therefore possible to support environment recognition of a system by having the center 10 to distribute scenery information as described above.

A scenery information database at the center 10 may be constructed based on image information acquired by each user terminal 20. This eliminates the need for installing cameras or the like to acquire scenery information and the like. As a result, information can be collected even in a depopulated area where no camera is normally installed if a vehicle loaded with a user terminal 20 is located in such an area. In a densely populated area whose scenery changes relatively rapidly as a result of construction and pulling down of buildings, scenery information can be updated in real-time by collecting image information from each user terminal 20.

In the implementation of supporting of environment recognition in such a manner, information as described below may be exchanged between the center 10 and the user terminals 20.

For example, information transmitted from the center 10 to the user terminals 20 may be scenery information, information on structures and routes of mobile bodies or statistical rules for identifying objects.

Scenery information may be a description of the relationship between objects that form a scene or information on three-dimensional structure of a scene. For example, the information on structures and routes of mobile bodies may be information on trucks and automobiles traveling forward on a road, information on buses arriving and departing a bus stop and information on trains passing in front of a user at a railroad crossing.

The statistical rules for identifying objects may be statements such as "vehicles exist on roads or in parking lots" and "many people exit on sidewalks and depot areas, shopping quarters and sight-seeing places are especially crowded by people".

The information transmitted from the user terminals 20 to the center 10 may be information for identifying objects of interest, information for correcting scenery information and the like.

The information for correcting scenery information is not only limited to information for correcting a structure database, but also it may include instructions from users. For example, it may be pieces of information such as "a new building was completed", "a road was made", "a private house was rebuilt with a second floor", "a pedestrian crossing was made", "a road was expanded", "a traffic light was installed", "trees have grown to obscure the sight", "a wall was built", "one-way traffic due to construction", "a temporary stage was made for an event" and so on.

(2) The system of the above-described embodiment may be used for control of vehicle positions. Specifically, a configuration is employed in which vehicle IDs are transmitted to the center 10 and in which the position of a vehicle of interest can be retrieved by using the present time, locations and vehicle IDs in profiles as conditions for retrieval. In this case, the profiles must be periodically transmitted to the center.

(3) A configuration in which location information is transmitted to the center 10 can be used for preventing thefts.

(4) User statuses may be managed at the center 10 to make it possible to catch emergency state of a user.

(5) Further, the center 10 may distribute not only information according to request for retrieval as in the above-described embodiment but also information associated with notification, warning and advertisement. For example, information such as "the in-door pool in kk Park is not open to public because it is occupied by a sports meeting", "traffic through ll Tunnel is disabled because of an accident", "traffic jam before aa Intersection because of construction", "there is a good Okonomiyaki restaurant in front of cc Park on ss Green Road", "there is a toilet at point bb on yy expressway" and "KK branch of UU Supermarket provides a morning fair from 10 to 12 today" may be transmitted to the user terminals 20.

(6) While the above-described embodiment has a configuration in which voice recognition dictionaries in accordance with various subjects are stored in advance in the voice recognition dictionary setting block 21 of the user terminal 20, voice recognition dictionaries and semantic networks in accordance with various subjects, environments and situations may be distributed from the center 10. This makes it possible to reduce erroneous recognition and to make speech-based interactions smooth.

(7) While the above embodiment has a configuration in which the user terminal 20 transmits profiles to the center 10 each time the user inputs information, an alternative configuration may be employed so that transmission occurs at constant intervals. Further, a configuration may be employed so that transmission is performed at predetermined locations and points in time. A configuration may be employed so that transmission occurs only in response to a request from the center 10.

The invention claimed is:

1. An information service system including a plurality of mobile user terminals and a center capable of data communication with said mobile user terminals, said center comprising:

database construction means for adding information based on terminal-side information, including data regarding an environment of a user that varies with movement of the user, transmitted by said mobile user terminals to an information database, the database construction means also for adding information obtained by editing the terminal-side information to the information database as information based on the terminal-side information, the information added to the information database being available to subsequent requesting ones of said mobile user terminals;

retrieval means for retrieving information according to the terminal-side information transmitted by said mobile user terminals based on the information database constructed by said database construction means; and distribution means for distributing the information retrieved by said retrieval means as distributed information, said mobile user terminals comprising:

input means for inputting information from a user;

situation detecting means for detecting information on the situation of said user, including the data regarding an environment of the user that varies with movement of the user;

terminal-side information generation means for generating said terminal-side information including at least information input with said input means and the situation information detected by said situation detecting means;

storage and transmission means for storing the terminal-side information generated by said terminal-side information generation means in memory means and for transmitting it to said center; and process execution means for executing a predetermined process based on the distributed information distributed by said center, wherein:

said retrieval means of said center retrieves according to a request for retrieval using information included in said terminal-side information, when said request for retrieval is included in said terminal-side information; and said process execution means of said mobile user terminals executes a notification process for providing notification of the requested information that is distributed by the center as distributed information.

2. An information service system according to claim 1, wherein:

said retrieval means of said center retrieves information relevant to said request for retrieval by inferring it from information included in said terminal-side information; and said information retrieved by said retrieval means includes data inferred by said retrieval means from a plurality of types of information included in said terminal-side information that includes data regarding the environment of said user.

3. An information service system according to claim 1, wherein said terminal-side information comprises information associated with predetermined entries for inferring information relevant to said request for retrieval.

4. An information service system according to claim 3, wherein said terminal-side information is stored, transmitted and received in profiles in which information associated with particular entries among said predetermined entries is described.

5. An information service system according to claim 3, wherein said terminal-side information generation means of said mobile user terminals generates said terminal-side information by inferring unknown information associated with entries of said terminal-side information based on past terminal-side information stored in memory means.

6. An information service system according to claim 3, wherein:

said retrieval means of said center retrieves unknown information associated with entries of said transmitted terminal-side information; and said process execution means of said mobile user terminals executes an information update process for adding information which is said unknown information retrieved by said retrieval means and which is distributed by said center as distributed information to terminal-side information stored in said memory means.

7. An information service system according to claim 6, wherein said retrieval means of said center selects past terminal-side information stored in said information database which is similar to said transmitted terminal-side information and retrieves unknown pieces of information in said transmitted terminal-side information based on said selected terminal-side information.

8. An information service system according to claim 7, wherein said retrieval means of said center selects past terminal-side information stored in said information database which is similar to said transmitted terminal-side information based on the degree of similarity calculated on the basis of said profiles.

9. An information service system according to claim 3, wherein said mobile user terminals further comprise:

priority setting means for setting priorities for predetermined entries of said terminal-side information based on information input with said input means; and query means for prompting a user to input information associated with an entry having a relatively high priority set by said priority setting means when said information does not satisfy predetermined conditions.

10. An information service system according to claim 1, wherein:
said mobile user terminals are used on board a vehicle;
said retrieval means of said center retrieves information on the scenery around the location of said vehicle when said transmitted terminal-side information includes information of the location of said vehicle;
said distribution means distributes said scenery information to said mobile user terminals as distributed information; and
said process execution means of said mobile user terminals executes a structure inference process for inferring structures around the vehicle based on said scenery information as said distributed information.

11. An information service system according to claim 10, wherein said scenery information is information transmitted by each of said mobile user terminals to said center as image information and edited at said center.

12. An information service system according to claim 1, wherein said environment of said user includes an outside temperature of a vehicle.

13. An information service system according to claim 1, wherein said information on the situation of said user detected by said situation detecting means includes at least data other than user data, including at least one of weather, traffic status, audio environment, speech state, and noise environment.

14. The information service system according to claim 1, wherein the storage and transmission means is further for automatically transmitting the terminal-side information to said canter when a user generated request for retrieval is made.

15. An information service system including a plurality of mobile user terminals and a center capable of data communication with said mobile user terminals,
said center comprising:
a database constructor for adding information based on terminal-side information transmitted by said mobile user terminals to an information database, including data regarding an environment of a user that varies with movement of the user, the database constructor also for adding information obtained by editing the terminal-side information to the information database as information based on the terminal-side information;
a retriever connected to said database constructor, for retrieving information according to the terminal-side information transmitted by said mobile user terminals based on the information database constructed by said database constructor; and
a distributor connected to the retriever, for distributing the information retrieved by said retriever as distributed information,
said mobile user terminals comprising:
an input unit for inputting information from the user;
a situation detector for detecting information on the situation of the user, including the data regarding an environment of the user that varies with movement of the user;
a terminal-side information generator connected to said input unit and said situation detector, for generating the terminal-side information including at least information input with said input unit and the situation information detected by said situation detector;
a storage unit for storing the terminal-side information generated by said terminal-side information generator in a memory;
a transmitter for transmitting said terminal-side information in said storage unit to said center; and
a process executer for executing a predetermined process based on the distributed information distributed by said center,
wherein the transmitter is further for automatically transmitting the terminal-side information to said center when a user generated request for retrieval is made, and the information added to the information database, including the data regarding an environment of a user that varies with movement of the user, becomes available to subsequent requesting ones of said user terminals.

16. An information service system including a plurality of user terminals mounted on a vehicle and a center capable of data communication with said user terminals,
said center comprising:
database construction means for adding information based on terminal-side information transmitted by said user terminals to an information database, including data regarding an environment of a user that varies with movement of the user, the database construction means also for adding information obtained by editing the terminal-side information to the information database as information based on the terminal-side information;
retrieval means for retrieving information according to the terminal-side information transmitted by said user terminals based on the information database constructed by said database construction means; and
distribution means or distributing the information retrieved by said retrieval means as distributed information,
said user terminals comprising:
input means for inputting information from a user;
situation detecting means for detecting information on the situation of said user, including the data regarding an environment of the user that varies with movement of the user;
terminal-side information generation mean for generation said terminal-side information including at least information input with said input means and the situation information detected by said situation detecting means;
storage and transmission means for storing the terminal-side information generated by said terminal-side information generation means in memory means and for transmitting it to said center; and
process execution means for executing a predetermined process based on the distributed information distributed by said center,
wherein the storage and transmission means is further for automatically transmitting the terminal-side information to said center when a user generated request for retrieval is made, and the information added to the information database, including the data regarding an environment of the user that varies with movement of the user, becomes available to subsequent requesting ones of said user terminals.

17. An information service system including a plurality of user terminals mounted on a vehicle and a center capable of data communication with said user terminals,
  said user terminals comprising:
    input means for inputting information from a user;
    situation detecting means for detecting information on the situation of the user, including data regarding an environment of the user that varies with movement of the user;
    terminal-side information generation means for generating terminal-side information including at least information input with said input means and the situation information detected by said situation detecting means;
    storage and transmission means for storing the terminal-side information generated by said terminal-side information generation means in memory means and for transmitting it to said center; and
    process execution means for executing a predetermined process based on the distributed information distributed by said center,
  wherein the storage and transmission means is further for automatically transmitting the terminal-side information to said center when a user generated request for retrieval is made, and information, including the terminal-side information, the data regarding an environment of the user that varies with movement of the user and information obtained by editing the terminal-side information as information based on the terminal-side information, is added to an information database, and becomes available to subsequent requesting ones of said user terminals.

18. An information service system including a plurality of user terminals mounted on a vehicle and a center capable of data communication with said user terminals,
  said center comprising:
    a database constructor for adding information based on terminal-side information transmitted by said user terminals, including data regarding an environment of a user that varies with movement of the user, to an information database, the database constructor also for adding information obtained by editing the terminal-side information to the information database as information based on the terminal-side information;
    a retriever connected to said database constructor, for retrieving information according to the terminal-side information transmitted by said user terminals based on the information database constructed by said database constructor; and
    a distributor connected to the retriever, for distributing the information retrieved by said retriever as distributed information,
  said user terminals each comprising:
    an input unit for inputting information from the user;
    a situation detector for detecting information on the situation of the user, including said data regarding an environment of the user that varies with movement of the user;
    a terminal-side information generator connected to said input unit and said situation detector, for generating said terminal-side information including at least information input with said input unit and the situation information detected by said situation detector;
    a storage unit for storing the terminal-side information generated by said terminal-side information generator in a memory;
    a transmitter for transmitting said terminal-side information in said storage unit to said center; and
    a process executer for executing a predetermined process based on the distributed information distributed by said center,
  wherein the transmitter is further for automatically transmitting the terminal-side information to said center when a user generated request for retrieval is made, and the information added to the information database, including said data regarding an environment of the user that varies with movement of the user, becomes available to subsequent requesting ones of said user terminals.

* * * * *